United States Patent [19]

Robnett

[11] Patent Number: 5,044,340

[45] Date of Patent: Sep. 3, 1991

[54] FUEL INJECTORS HAVING ADAPTER GROMMET

[75] Inventor: James T. Robnett, Newport News, Va.

[73] Assignee: Siemens Automotive L.P., Auburn Hills, Mich.

[21] Appl. No.: 472,526

[22] Filed: Jan. 30, 1990

[51] Int. Cl.$^5$ .............................................. F02M 61/14
[52] U.S. Cl. .................................... 123/470; 277/170; 123/472
[58] Field of Search ............... 123/468, 469, 470, 471, 123/472; 239/DIG. 4, 288.3, 585; 277/168, 170, 171

[56] References Cited

U.S. PATENT DOCUMENTS

| | | | |
|---|---|---|---|
| 2,477,533 | 7/1961 | Whiting | 277/170 |
| 4,014,372 | 3/1977 | Dichiara | 239/DIG. 4 |
| 4,240,384 | 12/1980 | Urbinati | 123/470 |
| 4,294,215 | 10/1981 | Hans | 123/470 |
| 4,570,602 | 2/1986 | Atkins | 123/468 |
| 4,945,877 | 8/1990 | Ziegler | 123/472 |

FOREIGN PATENT DOCUMENTS

| | | | |
|---|---|---|---|
| 0051157 | 3/1984 | Japan | 123/470 |
| 2125888 | 3/1984 | United Kingdom | 239/585 |

Primary Examiner—Carl Stuart Miller
Assistant Examiner—Erick Solis
Attorney, Agent, or Firm—George L. Boller; Russel C. Wells

[57] ABSTRACT

The O-ring seal at the tip end of a particular model of fuel injector is replaced by an adapter grommet which provides an axial seal. This makes the fuel injector interchangeable with another model of fuel injector that is specifically designed for an axial seal. The adapter grommet comprises a radially inner portion disposed in the injector tip's circular groove that was orignally intended for the O-ring seal, and a radially outer portion that axially overlaps both the groove and a portion of the tip that is distal to the groove. The radially outer portion of the adapter grommet provides the axial seal with the shoulder of a hole into which the tip is inserted.

24 Claims, 1 Drawing Sheet

FUEL INJECTORS HAVING ADAPTER GROMMET

BACKGROUND AND SUMMARY OF THE INVENTION

A typical way for mounting top-feed fuel injectors in a multi-point configuration on an internal combustion engine comprises the placement of each injector between a corresponding socket, or cup, of a fuel rail and a location in proximity to the intake of a corresponding cylinder. The top-feed end of each injector telescopically engages a socket, and the injector tip end fits into a hole in either the intake manifold or a runner leading to the manifold. In order to prevent leakage of liquid fuel at the two thusly formed joints for each injector, suitable seals are provided.

In one type of joint for the injector tip end, an axial seal is used; in another type, a radial seal is used. In each case the injector tip end is uniquely designed for the particular type of seal. An example of a radial seal type joint is an elastomeric O-ring that is seated in a suitable circular groove in the tip end, and whose outside diameter seals against the hole in the runner or manifold. Being designed for this one type of seal, the injector tip end is not intended for the other type of seal, and therefore one injector is not interchangeable with the other. In certain situations it may be advantageous for different injectors to be interchangeable.

The present invention relates to a fuel injector and seal configuration wherein an injector tip end that is use with an constructed with a circular groove for usual O-ring seal to provide radial sealing is adapted to provide axial sealing by means of a special elastomeric adapter grommet seal in place of the O-ring seal. Accordingly, the only significant tooling that is required to adapt the injector is the tooling used for fabricating the special adapter grommet. In other words, it becomes unnecessary to make tooling revisions to the tip end of the injector onto which the adapter grommet is disposed. The invention therefore represents a convenient and economical way to allow an injector tip end that has designed for radial sealing to be converted for axial sealing.

The foregoing features and benefits, along with others, will be seen by the reader in the following detailed description of a preferred embodiment of the invention according to the best mode contemplated at the present time for carrying out the invention. A drawing accompanies the written description and consists of the following Figures.

DESCRIPTION OF THE PREFERRED EMBODIMENT

Figure 1:
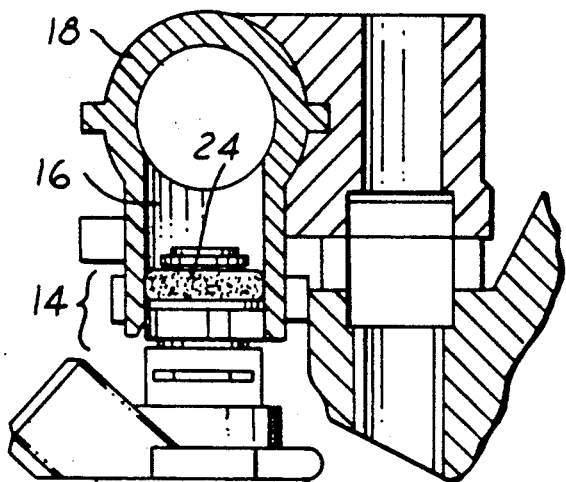
FIG. 1 is a longitudinal view of a fuel injector embodying an adapter grommet according to principles of the invention and shown in a typical installation in the fuel system of an engine.

FIG. 1 presents an electromagnetic fuel injector 10 having a tip end 12 and a fuel feed end 14. The fuel feed end is telescopically engaged with a circular cylindrical socket 16 of a fuel rail 18 while the tip end is engaged with a circular hole 20 in an intake manifold or runner 22. Fuel feed end 14 is exposed to pressurized liquid fuel in fuel rail 18, and when the injector is energized from an ECU (not shown), fuel is injected into manifold or runner 22 via tip end 12.

In order to prevent escape of liquid fuel at its respective connections with the fuel system, fuel injector 10 is provided with an elastomeric sealing means at each end. Fuel feed end 14 comprises a circular groove in which is seated an O-ring seal 24. The outside diameter of this seal is disposed against the wall of socket 16. Tip end 12 comprises a special adapter grommet in accordance with principles of the invention.

As can be seen in FIG. 1, tip end 12 comprises a radially outwardly facing circular groove 26. Groove 26 has an axial wall that is axially bounded by circular annular radial walls 28 and 30, the latter radial wall having a somewhat smaller outside diameter than the former. Wall 28 is disposed on the injector proximally of wall 30. Wall 30 is part of a circular flange 32. Distally of this flange, the diameter of the tip end is reduced from the flange diameter.

Figure 2:
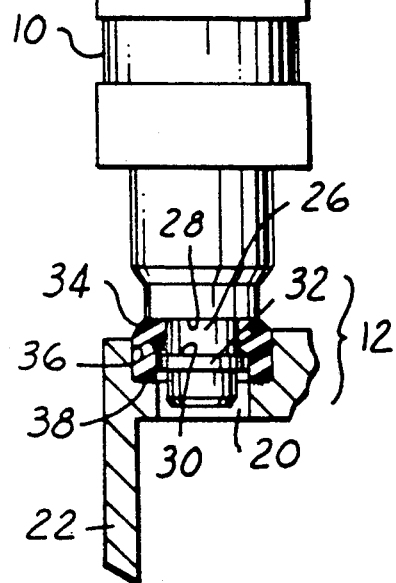
FIG. 2 is a proximal axial end view of the adapter grommet of FIG. 1 shown by itself on an enlarged scale.
Figure 2:
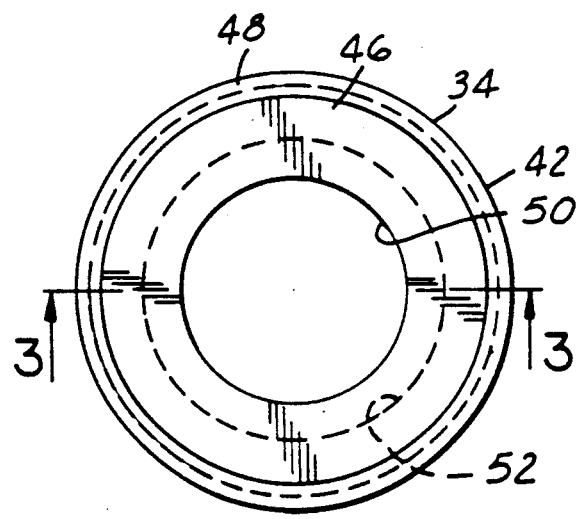
Figure 3:
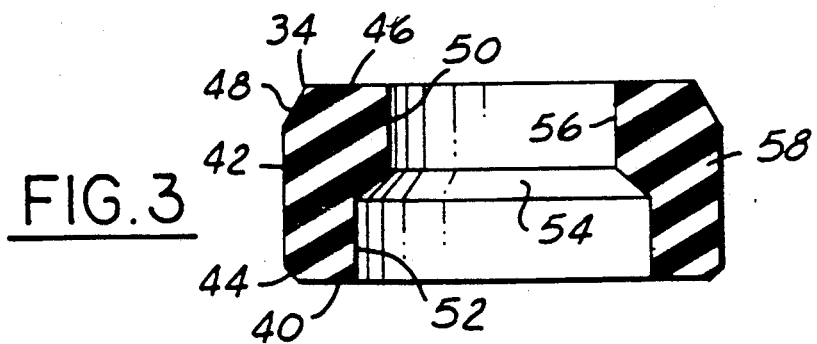
FIG. 3 is a diametrical cross sectional view taken in the direction of arrows 3—3 in FIG. 2.

The tip end of the injector was designed for a radial seal analogous to the radial seal of the fuel feed end. In other words, groove 26 was intended to seat an O-ring seal like O-ring seal 24 so that the outside diameter of the O-ring would seal against the wall of the hole into which the injector tip end was inserted. In accordance with the present invention, such an O-ring seal is not employed, and in its place is a special adapter grommet 34 that provides an axial face seal with hole 20. Hole 20 comprises a circular counterbore 36 that forms a shoulder 38 which faces fuel feed end 14, and it is against this shoulder that adapter grommet 34 seals. Details of the adapter grommet can be better seen in FIGS. 2 and 3.

The adapter grommet has a circular annular shape comprising a radial face 40 that abuts shoulder 38 and an axial face 42 that is disposed against the wall of counterbore 36. These two faces 40 and 42 are at a right angle to each other and are joined by a circular chamfer 44 that is at forty-five degrees to each. The adapter grommet also has a proximal radial face 46 that is disposed against wall 28 and joins with axial face 42 by means of a chamfer 48. Chamfer 44 principally forms a lead to facilitate the entry of the adapter grommet into counterbore 36 during installation of the fuel injector into the engine fuel system while chamfer 48 is principally an aid in the manufacture of the adapter grommet. The throughhole of the adapter grommet comprises a radially inwardly facing wall portion 50 adjacent the proximal end and a radially inwardly facing wall portion 52 adjacent the distal end. The latter has a larger diameter than the former, and the two are joined by a frusto-conically shaped wall portion 54 that faces both radially inwardly and axially distally.

The adapter grommet has sufficient elasticity to be fitted over the distal end of the injector tip and seat in groove 26 with wall portion 50 disposed against the axial wall of the groove and with face 46 disposed against wall 28. In this installed condition, the adapter grommet may be considered to comprise a radially inner portion 56 disposed within groove 26 and a radially outer portion 58 disposed exterior of the groove. This radially outer portion has an axial extent that axially overlaps the groove, flange 32, and the portion of the tip that is distal to flange 32. Where it overlaps flange 32, wall portion 52 may have contact with the flange edge while distally beyond the flange, wall portion 52 is spaced radially outwardly of the injector tip. It is this radially outer portion 58 of the adapter grommet that makes sealing contact with hole 20. While the purpose of the adapter grommet is, as stated earlier, to provide an axial seal by disposing face 40 against shoulder 38, contact between face 42 and the wall of counterbore 36 can provide radial sealing also.

Viewed another way, the adapter grommet may be considered to comprise an axially proximal portion that is disposed in groove 36 and an axially distal portion that is disposed axially beyond the groove in the direction away from fuel feed end 14. The axially distal portion provides the sealing contact with hole 20.

The adapter grommet can be fabricated of any elastomeric material that possesses suitable characteristics for automotive fuel system application. In use, the fuel pressure in the fuel rail will tend to urge the adapter grommet against shoulder 38.

While a presently preferred embodiment of the invention has been illustrated and described, it should be understood that principles of the invention may be practiced in other equivalent embodiments.

What is claimed as the invention is:

1. In a fuel-injected internal combustion engine comprising a fuel rail structure that supplies pressurized liquid fuel to one or more electrically operated fuel injectors which function to control the injection of fuel into an air induction system of the engine for entrainment with induction air to form a combustible mixture for use in a combustion chamber space of the engine, at least one of said injectors having a fuel feed end that is telescopically fitted in a sealed manner to said fuel rail structure to provide for passage of liquid fuel from said fuel rail structure into the injector, said at least one injector having a tip end at which fuel is emitted from the injector, said tip end comprising a circular annular groove that is open radially outwardly, and a circular annular seal that is seated in said groove and serves to seal between said tip end and an adjacent circular hole via which said injector tip end is in communication with said air induction system, the improvement comprising said hole being spaced axially and radially of said groove, and said circular annular seal comprising a radially inner portion that is disposed in said groove and a radially outer portion that is disposed radially outwardly of said groove and has an axial extent that overlaps both said groove and a portion of said tip end that lies axially beyond said groove in the direction away from said fuel feed end, said radially outer portion of said seal having sealing contact with said hole, said hole comprising a counterbore including an axially facing shoulder, and said radially outer portion of said seal comprising a radial face that is disposed against said shoulder and is in continuous sealing contact with said shoulder, such continuous sealing contact beginning radially outwardly of said groove and ending even further radially outwardly of said groove.

2. The improvement set forth in claim 1 in which said radially outer portion of said seal comprises a radially outer axial face that is disposed against an axial wall of said counterbore.

3. The improvement set forth in claim 2 in which said radial face of said seal is circular in shape and is disposed at a right angle to said axial face of said seal.

4. The improvement set forth in claim 3 in which a circular chamfer joins said radial and axial faces of said seal at a forty-five degree angle to each.

5. The improvement set forth in claim 1 in which said circular annular groove comprises a circular axial wall and circular radial walls axially spaced apart along said circular axial wall, said circular radial walls are at right angles to said circular axial wall, and said radially inner portion of said seal comprises a radially inwardly facing circular axial wall that is disposed against said circular axial wall of said groove and a circular radial wall that is disposed against one of said circular radial walls of said groove.

6. The improvement set forth in claim 5 in which said one of said circular radial walls of said groove is nearer said fuel feed end and faces axially toward said hole.

7. The improvement set forth in claim 6 in which said radially inner portion of said seal comprises an axially and radially facing circular annular wall that joins said radially inwardly facing circular axial wall of said radially inner portion of said seal with a radially inwardly facing circular axial wall of said radially outer portion of said seal.

8. An electrically operated fuel injector for controlling the injection of fuel into an internal combustion engine for entrainment with induction air to form a combustible mixture for use in a combustion chamber space of the engine, said fuel injector having a fuel feed end providing for passage of liquid fuel from a fuel rail into the fuel injector, said fuel injector having a circular tip end at which fuel is emitted from the fuel injector, said tip end comprising a circular axial wall, and a circular annular seal that is disposed against said circular axial wall for use in sealing between said tip end and an adjacent circular hole of an air induction system of the engine within which said tip end is disposed to place said tip end in communication with such an air induction system when the fuel injector is in use, said tip end comprising a circular annular flange that adjoins said circular axial wall and is disposed axially beyond said circular axial wall relative to said fuel feed end, characterized in that said circular annular seal comprises a radially inner portion that is disposed against said circular axial wall, and a radially outer portion that is disposed radially outwardly of said flange and has an axial extent overlapping both said radially inner portion of said seal and a portion of said tip end that lies axially beyond said radially inner portion of said seal in the direction away from said fuel feed end, said radially outer portion of said seal comprising an axial face that faces radially outwardly and axially overlaps and extends beyond said flange relative to said fuel feed end, said radially outer portion further comprising a radially inwardly facing axial wall that axially overlaps and extends axially beyond said flange relative to said fuel feed end, said radially outer portion of said seal still further comprising a radial face that faces in the direction axially away from said fuel feed end and is disposed axially beyond said flange relative to said fuel feed end to provide for sealing contact with an axially facing shoulder of the hole within which said injector tip end is disposed when the injector is in use.

9. A fuel injector as set forth in claim 8 in which said radial face of said seal is circular in shape and is disposed at a right angle to said axial face of said radially outer portion of said seal.

10. A fuel injector as set forth in claim 9 in which a circular chamfer joins said radial and axial faces of said radially outer portion of said seal at a forty-five degree angle to each.

11. A fuel injector as set forth in claim 8 in which said radially inner portion of said seal comprises a radially inwardly facing circular axial wall that is disposed against said circular axial wall of said tip end.

12. A fuel injector as set forth in claim 11 in which said radially inner portion of said seal comprises an axially and radially facing circular wall that joins said radially inwardly facing circular axial wall of said radially inner portion of said seal with said radially inwardly facing axial wall of said radially outer portion of said seal.

13. For use in a fuel-injected internal combustion engine having a fuel rail structure that supplies pressurized liquid fuel to one or more electrically operated fuel injectors which function to control the injection of fuel into an air induction system of the engine for entrainment with induction air to form a combustible mixture for use in a combustion chamber space of the engine, an electrically operated fuel injector comprising a fuel feed that is adapted to be fluid-connected in a sealed manner to such fuel rail structure to provide for passage of liquid fuel from the fuel rail structure into the fuel injector, and a tip end at which fuel is emitted from the fuel injector into such an air induction system, said tip end comprising a circular annular groove that is open radially outwardly and is axially bounded by a flange that is disposed immediately axially beyond said groove relative to said fuel feed end, and a circular annular seal that is seated in said groove and serves to seal between said tip end and an adjacent circular hole of such an air induction system within which said tip end is disposed to place said tip end in communication with such an air induction system when the fuel injector is in use, characterized in that said circular annular seal comprises a radially inner portion that is disposed in said groove and a radially outer portion that is disposed radially outwardly of said groove and has an axial extent that overlaps said groove, said flange, and a portion of said tip end that lies axially beyond said groove and flange in the direction away from said fuel feed, said radially outer portion of said seal comprising a radially inwardly facing axial wall that is disposed radially outwardly of said groove and axially overlaps and extends axially beyond said flange relative to said fuel feed, and said radially outer portion of said seal comprising a radial face that faces in the direction axially away from said fuel feed and is disposed axially beyond said flange relative to said fuel feed to provide for sealing contact with an axially facing shoulder of such a hole when the fuel injector is in assembly with the engine.

14. A fuel injector as set forth in claim 13 in which said radially outer portion of said seal comprises a radially outer axial face that is adapted to be disposed against an axial wall of such hole.

15. A fuel injector as set forth in claim 14 in which said radial face of said seal is circular in shape and is disposed at a right angle to said axial face of said seal.

16. A fuel injector as set forth in claim 15 in which a circular chamfer joins said radial and axial faces of said seal at a forty-five degree angle to each.

17. A fuel injector as set forth in claim 13 in which said circular annular groove comprises a circular axial wall and circular radial walls axially spaced apart along said circular axial wall, said circular radial walls are at right angles to said circular axial wall, and said radially inner portion of said seal comprises a radially inwardly facing circular axial wall that is disposed against said circular axial wall of said groove and an axially facing circular wall that is disposed against one of said radial walls of said groove.

18. A fuel injector as set forth in claim 17 in which said one of said radial walls of said groove is nearer said fuel feed and faces axially away from said fuel feed.

19. A fuel injector as set forth in claim 18, in which said radially inner portion of said seal comprises an axially and radially facing wall that joins said radially inwardly facing circular axial wall of said radially inner portion of said seal with said radially inwardly facing axial wall of said radially outer portion of said seal.

20. A fuel injector as set forth in claim 19 in which said radially outer portion of said seal comprises a radially outer axial face that is adapted to be disposed against an axial wall of such a hole.

21. In a fuel-injected internal combustion engine comprising a fuel rail structure that supplies pressurized liquid fuel to one or more electrically operated fuel injectors which function to control the injection of fuel into an air induction system of the engine for entrainment with induction air to form a combustible mixture for use in a combustion chamber space of the engine, at least one of said fuel injectors having a fuel feed that is fluid-connected in a sealed manner to said fuel rail structure to provide for passage of liquid fuel from said fuel rail structure into the injector, said at least one fuel injector having a circular tip end at which fuel is emitted from the injector, said tip end comprising a circular annular groove that opens radially outwardly and comprises a circular axial wall, and a circular annular seal that is disposed against said circular axial wall for use in sealing between said tip end and an adjacent circular hole of said air induction system within which said tip end is disposed to place said tip end in communication with said air induction system, said tip end comprising a circular annular flange that adjoins said circular axial wall and is disposed axially beyond said circular axial wall relative to said fuel feed, the improvement characterized in that said hole is spaced axially and radially of said circular axial wall and comprises a counterbore including an axially facing shoulder, said circular annular seal comprises a first portion that is disposed against said circular axial wall, and a second portion that is disposed to axially overlap said first portion of said seal, said flange, and a portion of said tip end that lies axially beyond said first portion of said seal in the direction away from said fuel feed, said second portion of said seal comprising an axial face that faces radially outwardly and axially overlaps and extends beyond said flange relative to said fuel feed, said second portion further comprising a radially inwardly facing annular axial wall that axially overlaps and extends axially beyond said flange relative to said fuel feed, and said second portion of said seal still further comprising a radial face that faces in the direction axially away from said fuel feed and that is disposed axially beyond said flange relative to said fuel feed in sealing contact with said axially facing shoulder.

22. The improvement set forth in claim 21 in which said radial face is disposed to have continuous sealing contact with said shoulder beginning radially outwardly of said groove and ending even further radially outwardly of said groove.

23. In a fuel-injected internal combustion engine having a fuel rail structure that supplies pressurized liquid fuel to one or more electrically operated fuel injectors which function to control the injection of fuel into an air induction system of the engine for entrainment with induction air to form a combustible mixture for use in a combustion chamber space of the engine, at least one of said electrically operated fuel injectors comprising a fuel feed that is fluid-connected in a sealed manner to such fuel rail structure to provide for passage of liquid fuel from said fuel rail structure into the fuel injector, and a tip end at which fuel is emitted from the fuel injector into said air induction system, said tip end comprising a circular annular groove that is open radially outwardly and is axially bounded by a flange that is disposed immediately axially beyond said groove relative to said fuel feed, and a circular annular seal that is seated in said groove and serves to seal between said tip end and an adjacent circular hole of said air induction system within which said tip end is disposed to place said tip end in communication with said air induction system, characterized in that said hole comprises a counterbore including an axially facing shoulder, and said circular annular seal comprises a first portion that is disposed in said groove and a second portion that is disposed to axially overlap said groove, said flange, and a portion of said tip end that lies axially beyond said groove and flange in the direction away from said fuel feed, said second portion of said seal comprising a radially inwardly facing annular axial wall that axially overlaps and extends axially beyond said flange relative to said fuel feed, and said second portion of said seal further comprising a radial face that faces in the direction axially away from said fuel feed and that is disposed axially beyond said flange relative to said fuel feed in sealing contact with said axially facing shoulder.

24. The improvement set forth in claim 22 in which said radial face is disposed to have continuous sealing contact with said shoulder beginning radially outwardly of said groove and ending even further radially outwardly of said groove.

* * * * *